Inventor
Richard G. Moe

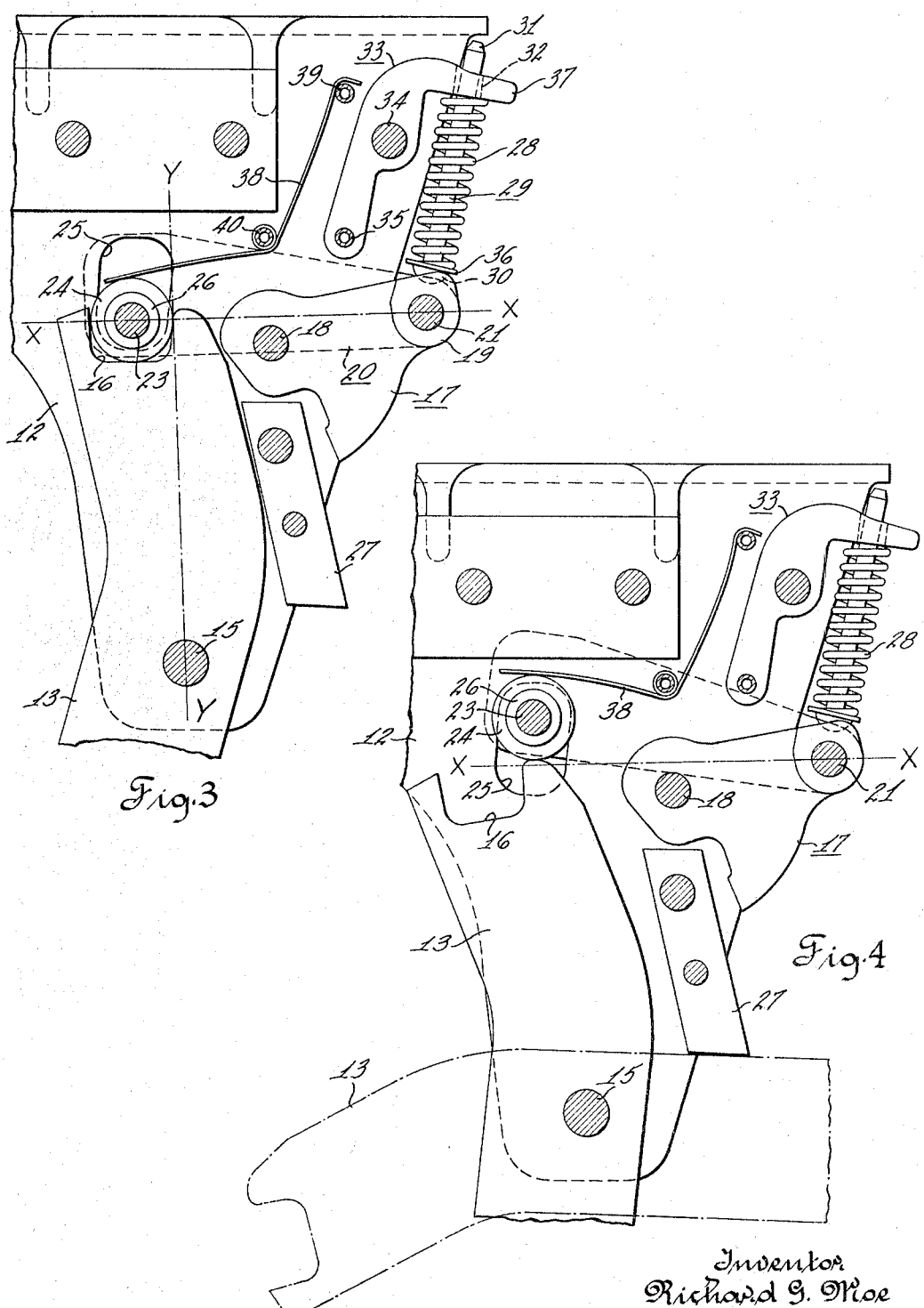

United States Patent Office 3,289,773
Patented Dec. 6, 1966

3,289,773
SPRING TRIP MECHANISM FOR PLOW BOTTOMS AND THE LIKE
Richard G. Moe, Waukesha, Wis., assignor to Allis-Chalmers Manufacturing Company, Milwaukee, Wis.
Filed Sept. 3, 1964, Ser. No. 394,229
7 Claims. (Cl. 172—269)

The present invention relates generally to agricultural implements, and more particularly to ground working implements such as plows and the like having ground working tool means operating below the surface of the ground, which tool means may be damaged by continued forward travel of the implement after one or more of the tool means encounters an obstruction.

More specifically, it is a feature of this invention to provide a trip linkage so constructed and arranged that the ground working tool is held to its work by a pivoted link which geometrically locks the standard in its operating position. However, upon occurrence of an overload, the pivot point for the locking link will move forwardly and upwardly against an adjustable spring resistance thereby disengaging the tool standard from the locking link and thereby freeing the tool for pivotal movement of the tool away from the obstruction which caused the overload condition.

The provision of yieldable means to mount plows or the like on their supports in order to avoid damage to the plow when obstructions are encountered is old and well known in the prior art. These release mechanisms have for the most part been the spring trip type which have had the common disadvantage of not always releasing at the same amount of overload. This wide variation in the overload required to effect a release has been primarily due to variable frictional resistance in the release mechanism which was adversely affected by dirt, rust and the like. Furthermore, the maximum tripping load has been difficult to adjust and the operative life of these previous plow trips has been shortened by wear resulting from friction between the release parts.

The objects of the present invention are to provide a simple and dependable spring trip release mechanism which will automatically trip when a predetermined load on the ground working tool is exceeded, which has a rolling contact between release parts thus greatly reducing friction and hence wear, which can be simply and economically produced, which is easy to adjust for different maximum loads and which is easily reset.

These and other objects and advantages of the present invention will be apparent to those skilled in the art after a consideration of the following detailed description, taken in conjunction with the accompanying drawings.

In the drawings:

FIG. 3 is a view similar to FIG. 2, showing the parts in position they occupy substantially at the beginning of the releasing action;

FIG. 4 is a view similar to FIG. 2 and which shows the parts after disconnection has been completed with the plow standard also shown in dashed lines indicating final release position;

Figure 1:
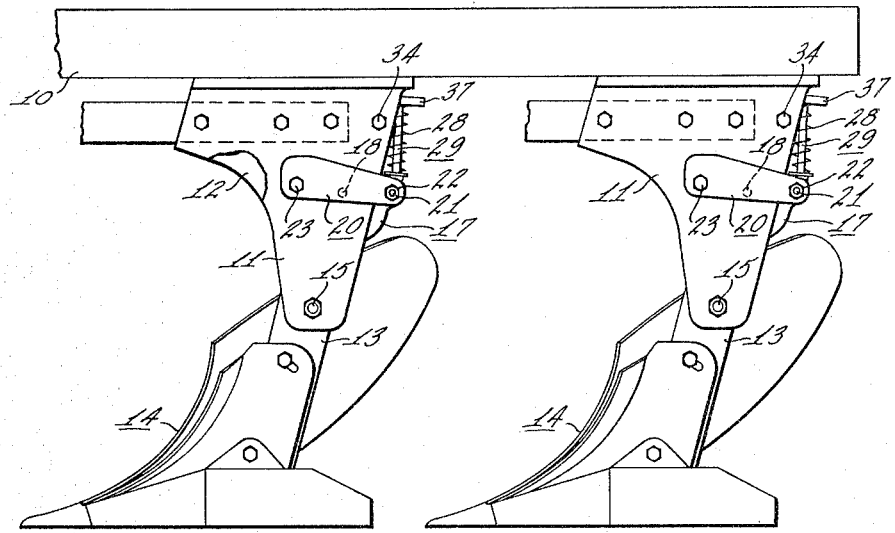
FIG. 1 is a side view of a tractor mounted plow in which the principles of the present invention have been embodied.
Figure 2:
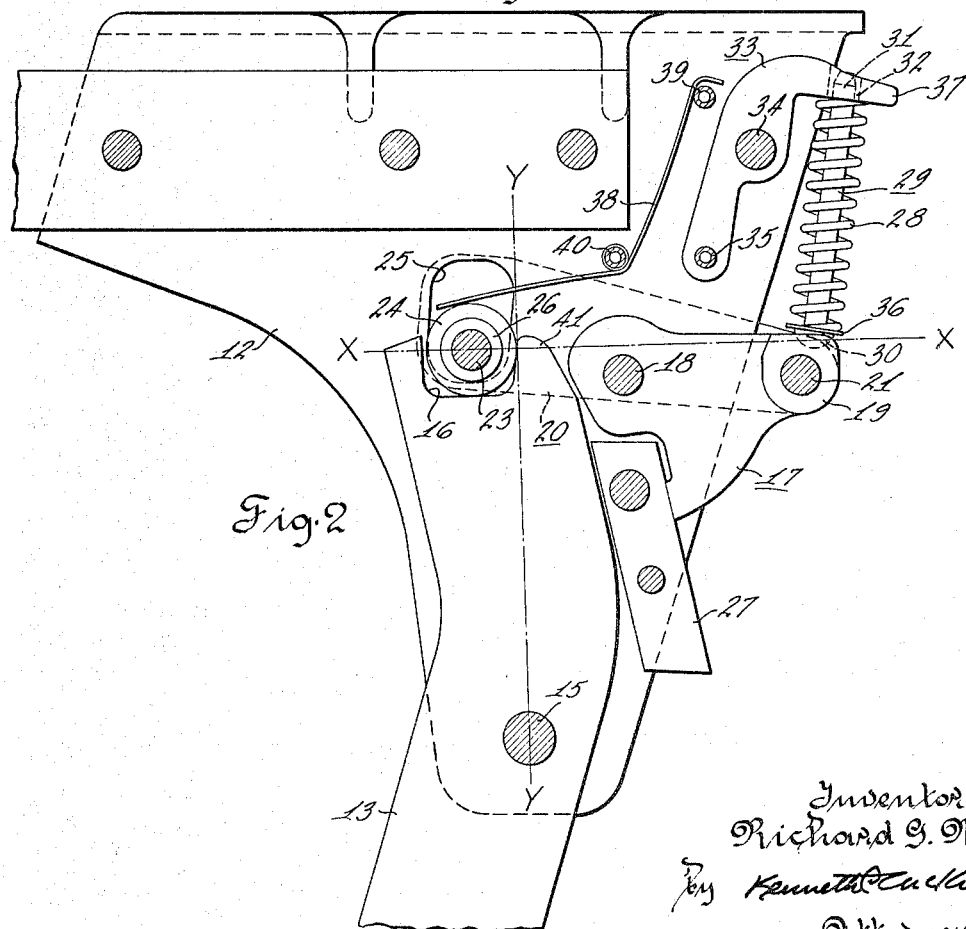
FIG. 2 is an enlarged fragmentary detail view with some parts removed for clarity of one form of the trip mechanism in the plow shown in FIG. 1.

Referring to FIG. 1, the invention has been shown as incorporated in a tractor carried moldboard plow having a plow beam 10 extending rearwardly from a tractor (not shown) through suitable hitch means (not shown). Adjacent the rear end of beam 10, a frame is secured consisting of transversely spaced support bracket plates 11 and 12 (see FIG. 2) which support a tool standard 13. Referring again to FIG. 1, the lower portion of the plow standard 13 supports a conventional moldboard plow bottom 14. The plow standard 13 is pivotally mounted between the bracket plates 11 and 12 by a pivot bolt 15 located adjacent to the lower ends of the bracket plates and intermediate the length of the plow standard 13. Referring to FIG. 2, preferably the plow standard extends forwardly and downwardly to the plow bottom attaching portion thereof and extends forwardly and upwardly toward the plow beam 10 from the pivot bolt 15.

The upper portion of standard 13 is formed with an upwardly facing generally semicircular roller receiving notch or seat 16. Link arm 17 is pivotally mounted on pin 18 between bracket plates 11 and 12 and extends rearwardly beyond these bracket plates with the rearward portion 19 thereof being apertured to pivotally mount a detent arm or link 20 by means of a pin 21. The detent arm 20 is preferably made up of a pair of strap members located outside of the bracket plates 11 and 12, as shown in FIGS. 1 and 2, with the rearward ends being united by pin 21 which is welded to one of the straps and which pin is threaded at the opposite end to receive a locking nut 22. The forward ends of the strap members forming detent arm 20 are similarly apertured to receive a pivot pin 23 which is welded to the opposite strap which was welded to pin 21. The other end of pin 23 being threaded to receive a lock nut (not shown). Between the straps of detent arm 20, a trip roller 24 is rotatably mounted on pivot pin 23. The bracket plates 11 and 12 are provided with arcuate slots 25 which receive the outer hub portion 26 of the roller 24 and provide limiting abutments for the upward travel of roller 24. The hubs 26 on the roller 24 are smaller in diameter than the slots 25 in the bracket plates 11 and 12 thereby permitting limited fore and aft movement of the roller as well as rotary movement about the axis of pin 21.

Link arm 17 is normally urged in a downward direction about the axis of pin 18 and against stop member 27 which is attached to plates 11 and 12 as by bolting or similar means. Stop member 27 provides a triple function in that it functions as a stop for link arm 17 and plow standard 13 in both the relatched of fully tripped positions. The bottom portion of stop 27 is contacted by standard 13 when standard 13 pivots about pivot 15. Link arm 17 is urged into contact with stop member 27 by means of a compression spring 28. Spring 28 surrounds a guide pin 29, the lower end of the pin having a head 30 which is received in a complementary pocket formed in the rear portion 19 of the link arm 17. The upper end 31 of spring guide pin 29 is received in an opening 32 in spring retainer 33. Spring retainer 33 is mounted between the upper portions of bracket plates 11 and 12 by means of bolt 34. Pivotal movement of spring retainer 33 about the axis of bolt 34 is normally prevented by a removable roll pin 35 which is received in transversely aligned openings in spring retainer 33 and bracket plates 11 and 12. The degree of spring pressure exerted on lever arm 17 is adjusted by adding or removing washers 36 from under the spring 28. This is easily accomplished by driving out the roll pin 35, then with a wrench clamped on the rearwardly extending lip 37 of the spring retainer 33, the retainer can be pivoted upwardly about bolt 34, allowing the spring and guide to be removed. Washers 36 can be added or removed, the spring and guide replaced and the spring retainer pivoted downwardly by means of the wrench attached to lip 37 until the roll pin 35 can be reinstalled through bracket plates 11 and 12 and spring retainer 33.

A leaf spring 38 is anchored between bracket plates 11 and 12 by means of a roll pin 39 which is located in an upper portion of the bracket plates 11 and 12. The spring 38 extends downwardly under a shouldered pin 40 with the lower end thereof resiliently engaging the top of roller 24. Spring 38 is relatively light and serves to insure the seating of the roller 24 in seat 16 during relatching the plow standard 13.

The operation of this spring trip standard is as follows:

The normal or working position of the parts is shown in FIG. 2. It is to be noted that the pivot axis of pin 21 of the detent arm 20 lies substantially below dead center or a line X—X drawn at right angles to line Y—Y and through the axis of roller 24. The line Y—Y is drawn through the axis of pivot 15 and the right-hand point of tangency with roller 24 and which point constitutes a thrust transmitting abutment between roller 24 and standard 13. With the parts in this position, there is a downwardly directed component of force tending to securely retain roller 24 in notch 16. If, for example, the point of the plow bottom should strike a stone or the like, the lower end of standard 13 will swing rearwardly (to the right as shown in FIG. 4) forcing the upper end of the standard forwardly. This causes the roller 24 to be moved forwardly relative to the bracket plate slots 25. However, this forward movement of the detent arm 20 results in link arm 17 pivoting counterclockwise about the axis of pin 18 against the bias of spring 28. This pivoting movement of link arm 17 raises the pivot axis of pin 21 of the detent arm 20 until a line drawn between the axis of roller 24 and the pivot point of pin 21 corresponds to the dead center line X—X.

Any further forward movement of roller 24 and detent arm 20 will raise the pivot point of pin 21 above this line X—X shown in FIG. 4 and demonstrates an upwardly directed component of force on the roller 24 which causes the roller to ride up in the notch 16 until the upper end of the standard 13 moves away from the roller. The plow standard is then free to swing into the nonworking position shown in broken lines in FIG. 4 where the plow is now positioned to clear the obstruction.

It should also be pointed out that when standard 13 is released and swings downwardly, the buildup of force is expended by the roller and arm 20 swinging upwardly about the pivot axis of pin 21. This eliminates the main spring from having to absorb the force of release and thereby increases the life of the spring.

To reset the trip mechanism the tractor is backed resulting in the upper end of the plow standard 13 being swung rearwardly from contact of the ground working tool with the ground, a cam section 41 engages the roller 24 which will roll along the surface 41 against the light resistance of the leaf spring 38 into a position to drop into the notch or seat 16, whereby the trip mechanism is reset and the plow is again protected against damage should another obstruction be encountered. The trip mechanism can readily be reelased manually by pivoting the roller out of the notch against the light resistance of the leaf spring.

Figure 5:
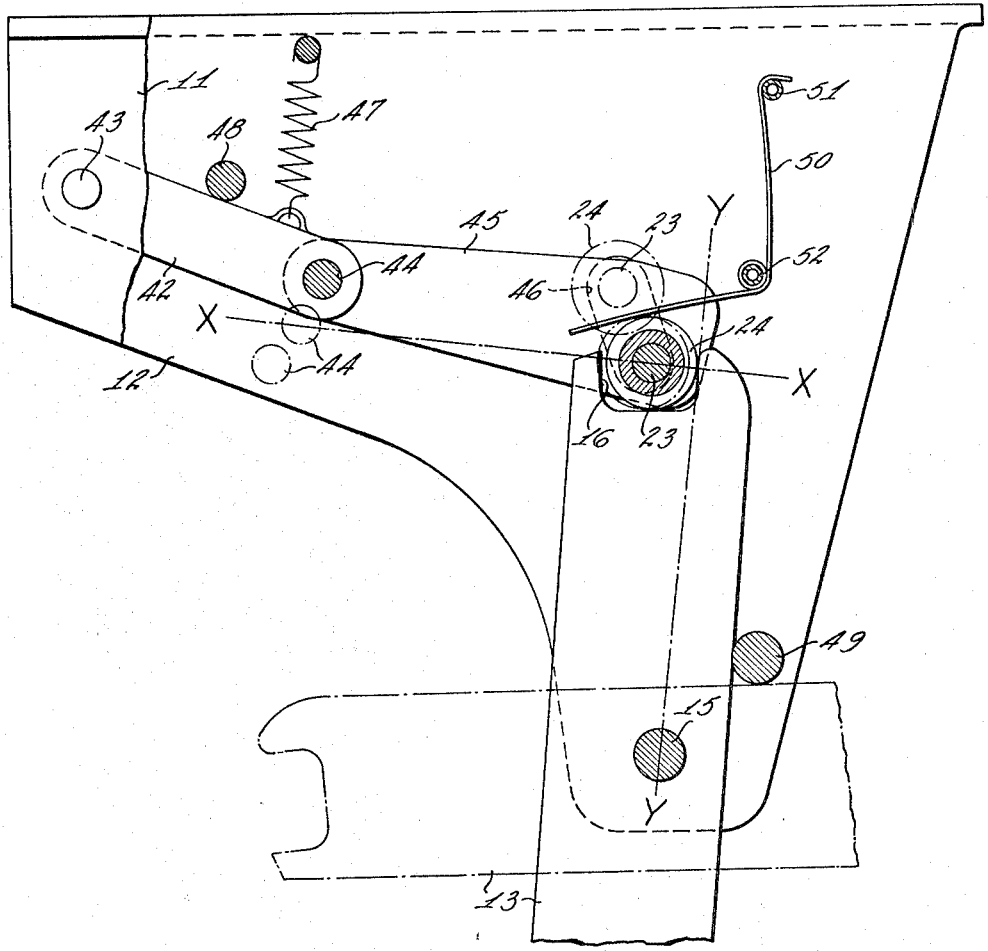
FIG. 5 is a view similar to FIG. 2 showing another embodiment of this invention and including a showing in dashed lines of the parts at the moment of release.

Referring now to FIG. 5, another embodiment of this invention is therein shown.

In this embodiment elements which are identical to those previously described have been given the same reference numerals for ease in comparison. Transversely spaced side plates 11 and 12 pivotally support a tool standard 13 by means of a pivot pin 15. At the forward end of plates 11 and 12, a link 42 is pivotally supported between said plates by means of pivot pin 43. The other end of link 42 is apertured to receive a pivot pin 44 which is also pivotally connected to one end of a pair of strap link members 45 (only one of which is shown) which are mounted in straddling relation to link 42. The rearward ends of the strap members 45 are connected by means of a pivot pin 23 which is joined to members 45. A roller 24 is rotatably mounted on pin 23 between members 45. The plates 11 and 12 are provided with arcuate slots 46 which receive the outer portions of pins 23. It should be understood that the outer portions of pins 23 are smaller in diameter than the slots 46 in the bracket plates 11 and 12 thereby permitting limited fore and aft movement of the roller as well as pivotal movement about the axis of pin 44. Links 42 and 45 are normally biased upwardly at their point of mutual connection by means of tension spring 47 which is connected between a loop portion of link 42 and a pin carried by plates 11 and 12, such upward movement being limited by stop member 48 carried by plates 11 and 12. Another stop member 49 carried by plates 11 and 12 limits the rearward swinging movement of the upper end of standard 13 and the forward swinging movement of the upper portion of standard 13 about pivot 15. A leaf spring 50 is anchored between plates 11 and 12 by means of a roll pin 51 which is located in the upper portion of the bracket plates 11 and 12. The spring 50 extends downwardly under a shouldered pin 52 with the lower end thereof resiliently engaging the top of roller 24. The spring 50 is relatively light and serves to insure seating of the roller 24 in the notch 16 in the upper portion of standard 13.

The operation of the embodiment shown in FIG. 5 is as follows:

The normal or working position of the parts is shown in full lines in FIG. 5 with adjusted positions shown in dashed lines. It is to be noted that the pivot axis of pivot 44 lies substantially above dead center or a line X—X drawn at right angles to line Y—Y and through the axis of roller 24. Line Y—Y is drawn through the center of pivot 15 and tangential to roller 24. With the parts in this position, there is a downwardly directed component of force tending to securely retain the roller in the notch 16. If an obstruction is encountered by the plow attached to standard 13, the lower end of the standard will swing rearwardly, forcing the upper end of the standard forwardly. This causes the roller 24 to be moved forward relative to the bracket plate slots 46. However, this forward movement of link 45 results in links 42 and 45 pivoting downwardly against the action of spring 47 about the axis of pin 43. This downward movement of links 42 and 45 lowers the pivot point of pin 44 until a line drawn between the axis of the roller 24 and the pivot point of pin 44 corresponds to the dead center line X—X.

Any further forward movement of the roller and link 45 will lower the pivot point of pin 44 below this line X—X resulting in an upwardly directed component of force on the roller 24 thereby causing the roller to ride up in notch 16 until the upper end of standard 13 moves away from the roller. The plow standard is then free to swing into the position shown in broken lines wherein the plow bottom can clear the obstruction.

The return of the standard to operating position is the same as described for the preferred embodiment of this invention which has been previously described.

It should be understood that it is not intended to limit the invention to the specific structure herein shown and described for the purposes of illustration, as various modifications within the scope of the appended claims may occur to persons skilled in the art.

The embodiments of the invention in which an exclusive property or privilege is claimed are defined as follows:

1. In a spring trip mechanism for plow bottoms and the like, the combination of a support, a tool standard mounted on said support for swinging movement between working and nonworking positions about a first pivot center and having a thrust transmitting abutment on a line of force tangential to an arc about said first pivot center; a first link pivotally mounted on said support at a second pivot center spaced from said first pivot center and in swingable relation to said tool standard; a second link pivotally mounted on said first link at a third pivot center spaced from said second pivot center; a trip roller cooperable with said abutment on said line of force; connecting means between said second link and roller presenting a fourth pivot center spaced from said third pivot center a fixed radial distance therefrom of such length that operative engagement of said roller with said abutment on said line of force while said tool standard is in said working position establishes a toggle relation between said first and second links which places said third pivot center at one side of said line of force and which causes said third pivot center to move to the other side of said line of force in response to movement of said tool standard from said operative toward said inoperative position; and resilient means operatively associated with said links so as to yieldingly oppose said movement of said third pivot center.

2. The combination set forth in claim 1 wherein said second pivot center is arranged in such relation to said first pivot center that movement of said tool standard from its working toward its nonworking position will cause said thrust transmitting abutment thereon to recede from said second pivot center.

3. The combination set forth in claim 1 wherein said second pivot center is arranged in such relation to said first pivot center that movement of said tool standard from its working toward its nonworking position will cause said thrust transmitting abutment thereon to approach said second pivot center.

4. In a spring trip mechanism for plow bottoms and the like, the combination of a support, a tool standard pivotally mounted on said support at a first pivot center and presenting an upper end portion swingable in a forward direction upon rearward swinging movement of the lower end of said tool standard about said first pivot center from a working to a nonworking position, said end portion of said tool standard having a forwardly facing thrust transmitting abutment on a line of force which, in said operative position of said tool standard, extends in a fore and aft direction at a predetermined radial distance above said first pivot center; a first link pivotally mounted on said support at a second pivot center spaced upwardly from said first pivot center a shorter distance than said predetermined radial distance and being swingable in rearwardly extending relation to said second pivot center; a second link pivotally connected with said first link at a third pivot center in rearwardly spaced relation to said second pivot center; stop means cooperable with said first link to determine a downwardly adjusted limit position of said first link which places said third pivot center below said line of force while said tool standard is in said working position; resilient means operatively associated with said first link so as to yieldingly oppose upward swinging thereof from said downwardly adjusted limit position; and a trip roller mounted on said second link at a fourth pivot center spaced forwardly from said third pivot center a fixed radial distance of such length that a line through said third and fourth pivot centers will fall above said second pivot center and below said line of force when said roller engages said abutment of said tool standard while the latter is in said working position.

5. The combination set forth in claim 4 and further comprising an abutment on said support cooperable with said roller to limit upward movement of the latter from its position of cooperative engagement with said abutment of said tool standard.

6. The combination set forth in claim 4 and further comprising stop means on said support cooperable with said roller so as to determine a limit position of pivotal downward swinging movement of said second link about said third pivot center.

7. The combination set forth in claim 6 and further comprising auxiliary resilient means operatively interposed between said support and second link for urging the latter toward said limit position of pivotal downward swinging movement about said third pivot center.

References Cited by the Examiner
UNITED STATES PATENTS 2,850,957   9/1958   Silver _____ 172—269
3,125,167   3/1964   Mannheim et al. _____ 172—269

FOREIGN PATENTS 1,358,567   11/1964   France.

ABRAHAM G. STONE, *Primary Examiner.*

ANTONIO F. GUIDA, *Examiner.*

J. R. OAKS, *Assistant Examiner.*